United States Patent

Kaneko et al.

[11] Patent Number: 6,149,861
[45] Date of Patent: Nov. 21, 2000

[54] METHODS FOR MANUFACTURING R-FE-B TYPE MAGNET RAW MATERIAL POWDER AND R-FE-B TYPE MAGNET

[75] Inventors: Yuji Kaneko, Uji; Yasuhide Sasakawa, Osaka; Katsuya Kase, Niihama; Takashi Hashikawa, Niihama; Kaname Takeya, Niihama, all of Japan

[73] Assignee: Sumitomo Special Metals Co., Ltd., Osaka, Japan

[21] Appl. No.: 09/462,902

[22] PCT Filed: May 18, 1999

[86] PCT No.: PCT/JP99/02560

§ 371 Date: Apr. 6, 2000

§ 102(e) Date: Apr. 6, 2000

[87] PCT Pub. No.: WO99/60580

PCT Pub. Date: Nov. 25, 1999

[30] Foreign Application Priority Data

May 18, 1998 [JP] Japan ................... 10-153850

[51] Int. Cl.[7] ........................... B22F 1/00
[52] U.S. Cl. .............. 419/29; 419/30; 419/34; 419/38; 148/103
[58] Field of Search ............... 148/105; 149/34, 149/38, 29, 30

[56] References Cited

U.S. PATENT DOCUMENTS

| | | | |
|---|---|---|---|
| 4,853,045 | 8/1989 | Rozendaal | 148/103 |
| 4,913,745 | 4/1990 | Sato | 148/103 |
| 5,033,797 | 7/1991 | Rueb | 500/5 |
| 5,061,106 | 10/1991 | Kent | 401/268 |

*Primary Examiner*—Daniel J. Jenkins
*Attorney, Agent, or Firm*—Dykema Gossett PLLC

[57] ABSTRACT

It is an object of the present invention to provide a method for manufacturing a raw material alloy powder that can be utilized effectively in the regeneration of surplus or defective R—Fe—B type sintered magnets while leaving the main phase crystal grains alone, and a method for manufacturing an R—Fe—B type magnet. Surplus or defective R—Fe—B type sintered magnets are pulverized, acid washed, and dried, after which this product is subjected to a calcium reduction treatment and washed to remove the calcium component, which allows a raw material alloy powder composed of an $Nd_2Fe_{14}B$ main phase system, which contributes the most to magnet characteristics, to be regenerated efficiently. An alloy powder for compositional adjustment that improves sintering and adjusts the composition is added to this main phase system raw material alloy powder to produce a sintered magnet, which facilitates the manufacture of a sintered magnet with superior magnet characteristics.

10 Claims, No Drawings

METHODS FOR MANUFACTURING R-FE-B TYPE MAGNET RAW MATERIAL POWDER AND R-FE-B TYPE MAGNET

TECHNICAL FIELD

The present invention relates to manufacturing methods for obtaining an R—Fe—B type sintered magnet alloy powder through the regeneration of these magnets, and particularly scrap, surplus, and defective magnets, and for obtaining an R—Fe—B type magnet with excellent magnetic characteristics.

BACKGROUND ART

In general, an R—Fe—B type sintered magnet is composed of a main phase of $Nd_2Fe_{14}B$ and an R-rich phase and a B-rich phase that serve as boundary phases. Various research has been conducted and proposals made in an effort to increase the $Nd_2Fe_{14}B$ main phase, which affects the magnetic characteristics.

Meanwhile, R—Fe—B type sintered magnets may undergo dimensional changes, cracking, and distortion during sintering and magnet assembly, and the defect rate thereof can be as high as 10%, which is a major obstacle to reducing the cost of the magnets.

Methods known in the past for regenerating surplus and defective rare earth magnets include a wet metallurgical process in which the above-mentioned magnets are all chemically dissolved, and the rare earth components are extracted from the solution; a dry metallurgical process called smelting in which scraps of sintered magnets, defective magnets, or the like are melted and made into an R—Fe—B type alloy, and this alloy is reused as a starting material; and a method in which scraps or defective sintered magnets are reused as a mother alloy for melting.

A method for regenerating rare earth magnets has also been proposed in Japanese Laid-Open Patent Application Sho 58-049631, in which the impurity oxygen and carbon components in the defective magnets are mixed with calcium or $Ca(OH)_2$ and the mixture is subjected to calcium reduction decarburization to remove the oxygen and carbon, and in Japanese Laid-Open Patent Application Sho 61-153201, in which the carbon is first removed by heat treatment in a dehydrogenated atmosphere, after which direct reduction is performed with calcium to remove the oxygen.

The above-mentioned wet metallurgical process, which is a conventional regeneration method, is relatively advantageous in the case of an R—Co—based magnet which involves complicated steps and whose main structural component is a rare earth metal or a relatively expensive element such as cobalt, but in the case of an R—Fe—B type magnet, because the magnet contains about 65% iron, which is inexpensive, this process has little merit from a cost standpoint.

A dry metallurgical process, meanwhile, generates a large amount of slag during melting, and the rare earth elements are inevitably eluted into the slag, which requires that the rare earth metal components be recovered from the slag in a separate step.

Furthermore, the composition has to be readjusted in order to use re-melted magnets as a mother raw material for melting, and the components are difficult to control, among other disadvantages, and problems encountered with re-melting include the difficulty of removing oxygen down to the original level of the molten alloy.

The above melting methods essentially all involve regeneration into an alloying raw material, and do not allow for effective regeneration while leaving alone the texture of the sintered magnets, and particularly the main phase crystal grains, with which the magnetic characteristics will be enhanced.

Also, the above-mentioned methods for regenerating surplus or defective rare earth magnets by calcium reduction are aimed at the polishing dust, fragments, and chunks that are produced in the process of manufacturing rare earth magnets, and are substantially aimed at the polishing dust of SmCo-based magnets.

DISCLOSURE OF THE INVENTION

It is an object of the present invention to solve the various problems encountered with conventional methods for regenerating scrap, surplus, or defective R—Fe—B type sintered magnets into alloy powders for these magnets, and to provide a method for manufacturing an R—Fe—B type magnet raw material powder with which regeneration can be accomplished more efficiently and with which natural resources can be more effectively utilized and environmental protection achieved through recycling, by effectively utilizing these magnets while leaving the main phase crystal grains alone. It is a further object to provide a method for manufacturing an R—Fe—B type magnet with which it is possible to obtain an R—Fe—B type magnet with superior magnetic characteristics through the use of this raw material powder.

The inventors researched various methods for efficiently regenerating magnets while leaving their main phase crystal grains alone, and as a result perfected this invention upon discovering that an inexpensive R—Fe—B type magnet with excellent magnetic characteristics can be provided by taking the main phase $R_2Fe_{14}B$ crystal grains out of magnet scraps or defective sintered magnets and using these as an R—Fe—B type raw material powder, replenishing this raw material powder with the rare earth components required for liquid phase sintering, mixing in an adjustment-use raw material powder for adjusting the magnet composition, then molding, sintering, and aging this mixture.

Specifically, the present invention is a method for manufacturing an R—Fe—B type magnet raw material powder, characterized in that an R—Fe—B type sintered magnet is pulverized to an average particle size of 5 mm or less, after which this pulverized powder and magnet scraps are acid washed to reduce the amount of oxygen and carbon components in the pulverized powder and eliminate the R-rich and B-rich boundary phases, the result of which is that the acid-washed powder consists almost solely of an $Nd_2Fe_{14}B$ main phase, after which this powder is dried and then subjected to a reduction step using calcium or $CaH_2$ to reduce and remove any $O_2$ component remaining in the treated powder, and this reaction product is subjected to a wet treatment to remove any remaining calcium component, after which this product is dried to obtain a magnet raw material powder composed almost solely of an $Nd_2Fe_{14}B$ main phase.

The present invention is also a method for manufacturing an R—Fe—B type magnet, characterized in that an adjustment-use alloy powder composed of 13 to 45 at % R, no more than 12 at % B, and the remainder Fe, which is the principal component, is added to the above-mentioned regenerated alloy powder composed almost solely of an $Nd_2Fe_{14}B$ main phase in a ratio of from 10:90 to 90:10 (wt %), after which this blend is molded, sintered, and aged, allowing a high-performance magnet to be produced with ease.

BEST MODE FOR CARRYING OUT THE INVENTION

In the present invention, the pulverization of the sintered magnet may be accomplished by a known method, either $H_2$ pulverization or mechanical pulverization in an inert gas atmosphere of $N_2$ gas, argon gas, or the like. It is preferable for the size of the pulverized material thus obtained to be 5 mm or less. Exceeding 5 mm is undesirable because not enough of the $O_2$ component can be removed. Magnet scraps, such as machining tailings, fragments, or the like, can be acid washed as they are, without first being pulverized. Magnet scraps can also be mixed with pulverized magnet before treatment.

In the acid washing that is performed in order to remove the carbon and $O_2$ components from the above-mentioned sintered magnet and to dissolve away the R-rich and B-rich boundary phases, it is preferable to add an acetic acid aqueous solution or the like as an acid solution, and it is preferable for the pH of the acid solution to be from 2.0 to 5.0.

As a result of the above-mentioned acid washing, the treated powder will contain trace amounts of oxygen and carbon in addition to the $Nd_2Fe_{14}B$ main phase that accounts for almost all of the powder, so calcium or $Ca(OH)_2$ is added to the above-mentioned treated powder to reduce it. The amount of calcium or $Ca(OH)_2$ added is preferably 1.1 to 4.0 times the stoichiometric amount needed for the reduction of the rare earth oxides, the temperature during reduction is 900 to 1200° C., and the reduction preferably lasts from 1 to 5 hours.

Any $O_2$ component that remains after the acid washing is reduced and removed by this calcium reduction treatment, but the remaining calcium component needs to be removed from this reaction product, for which a wet washing treatment or the like is employed.

The wet washing treatment for removing the calcium component after the calcium reduction treatment is preferably washing with a dilute acid such as deionized water, and it is preferable for the washing conditions to include a pH of 11 or lower.

In the present invention, the raw material powder produced by pulverizing and acid washing a sintered magnet, subjecting this product to calcium reduction, and then regenerating the magnet by wet washing is composed almost solely of an $Nd_2Fe_{14}B$ main phase. To use this regenerated raw material powder to prepare an R—Fe—B type magnet raw material powder with the required composition, an alloy powder for compositional adjustment composed of 13 to 45 at % R, no more than 12 at % B, and the remainder Fe, which is the principal component, is added in order to improve sintering and adjust the composition of the above-mentioned regenerated powder.

The reason for limiting the ratio in which the regenerated raw material powder is blended with the powder for compositional adjustment to between 10:90 and 90:10 (wt %) is that using this regenerated powder in an amount less than 10 wt % and the powder for compositional adjustment in an amount over 90 wt % is undesirable in terms of enhancing the magnetic characteristics or the usage efficiency of the regenerated powder, and using this regenerated powder in an amount over 90 wt % and the powder for compositional adjustment in an amount less than 10 wt % is undesirable in that the liquid phase will not appear sufficiently during sintering, and the density after sintering will be inadequate.

The R—Fe—B type powder for compositional adjustment can be an isotropic or anisotropic powder obtained by any of various manufacturing methods, such as a melt pulverization method in which the required R—Fe—B type alloy is melted and cast and then pulverized; a direct reduction and dispersion method in which a powder is obtained directly by calcium reduction; a quench alloying method in which the required raw material alloy is obtained as a ribbon foil by melt jet caster, and this foil is pulverized and annealed; a gas atomization method in which the required R—Fe—B type alloy is melted, and this melt is powderized and heat treated by gas atomization; a mechanical alloying method in which the required raw material metal is powderized, then micropowderized by mechanical alloying, and heat treated; and a method in which the required R—Fe—B type alloy is heated, decomposed, and recrystallized in hydrogen (HDDR method).

In the present invention, it is preferable for the rare earth element R in the regenerated R—Fe—B type magnet raw material powder and the powder for compositional adjustment to include at least one member of the group consisting of Nd, Pr, Dy, Ho, and Tb, or also at least one member of the group consisting of La, Ce, Sm, Gd, Er, Eu, Tm, Yb, Lu, and Y. The R of the regenerated R—Fe—B type magnet raw material powder preferably accounts for 11 to 13 at % of the composition.

The rare earth element R in the powder for compositional adjustment preferably accounts for 13 to 45 at %. Specifically, at less than 13 at %, the liquid phase will not appear sufficiently during sintering in blending with the main phase raw material to manufacture a magnet, but exceeding 45 at % is undesirable because it will lead to an increase in the oxygen content.

One type of R is usually adequate for the powder used for compositional adjustment, but a mixture of two or more types (misch metal, didymium, etc.) can be used for reasons such as ready availability. This R need not be a pure rare earth element, and may instead contain impurities that are inevitable in manufacture within an industrially available range.

R is an essential element in the R—Fe—B type magnet produced by the manufacturing method of the present invention, and if it accounts for less than 10 at %, the crystal structure will be a cubic system with the same structure as α-iron, so good magnetic characteristics, and coercive force in particular, will not be obtained. If 30 at % is exceeded, however, there will be a large R-rich non-magnetic phase, the residual flux density (Br) will decrease, and a permanent magnet with excellent characteristics will not be obtained.

Boron is an essential element in the magnet, and if it accounts for less than 2 at %, the main phase will have a rhombohedral structure and a high coercive force (iHc) will not be obtained, but if 28 at % is exceeded, there will be a large boron-rich non-magnetic phase and the residual flux density (Br) will decrease, so a permanent magnet with excellent characteristics will not be obtained. Thus, the preferred range for boron is 2 to 28 at %.

Also, if boron accounts for more than 12 at % of the compositional adjusting powder, there will be an excess of boron-rich phase or Fe—B phase besides the $R_2Fe_{14}B$ phase, and thus the preferable range for boron is 12 at % or less.

Iron is an essential element in the above-mentioned magnet, and if it accounts for less than 65 at %, the residual flux density (Br) will decrease, but a high coercive force will not be obtained if 80 at % is exceeded, so iron should be contained in an amount of 65 to 80 at %.

Replacing part of the iron with cobalt allows the temperature characteristics to be improved without any loss of the magnetic characteristics of the obtained magnet, but replacing more than 20% of the iron with cobalt is undesirable because the magnetic characteristics will conversely deteriorate. An amount of cobalt replacement of 5 to 15 at % of the total amount of iron and cobalt is favorable in terms of obtaining a high magnetic flux density because (Br) will be higher than when there is no replacement.

In addition to R, boron, and iron, the presence of impurities that are unavoidable in industrial production is also allowed. For example, a permanent magnet will be easier to manufacture and cost less if part of the boron is replaced with one or more of carbon (4.0 wt % or less), phosphorus (2.0 wt % or less), sulfur (2.0 wt % or less), and copper (2.0 wt % or less), in a total amount of 2.0 wt % or less.

Furthermore, one or more members of the group consisting of Al, Ti, V, Cr, Mn, Bi, Nb, Ta, Mo, W, Sb, Ge, Ga, Sn, Zr, Ni, Si, Zn, and Hf can be added as needed to the regenerated powder or the compositional adjusting powder in order to improve the coercive force of the magnet powder or the angularity of the demagnetization curve, or to make the magnet easier to manufacture and lower in cost. The upper limit to the added amount should satisfy the conditions required for the (BH)max and (Br) values of the magnet to be the required values.

EMBODIMENTS

Embodiment 1

A crude pulverized powder with an average particle size of 1 to 5 mm was obtained by $H_2$ occlusion decay of defective R—Fe—B type magnets with a composition of 14.0 at % Nd, 6.5 at % B, 78.5 at % Fe, and 1.0 at % Co and dimensions of 4 to 5 mm×4.5 mm×8 mm. 1 kg of this crude pulverized powder was put in a stainless steel vessel, after which a five-fold acetic acid aqueous solution was added dropwise while the system was agitated for 10 minutes with the pH held at 3.5 to perform acid washing. After this, the system was washed for 5 minutes with deionized water to thoroughly remove the acid component, and this product was vacuum dried, which yielded 920 g of regenerated material. 200 g of metallic calcium granules were mixed with 900 g of the above-mentioned regenerated powder, and this mixture was kept for 3 hours at 1000° C. in argon gas, after which the reaction product was cooled and taken out, which yielded a block with an average particle size of 20 mm. This was then put in deionized water, after which it was agitated for 10 minutes until the pH was 10 or less, and then dried to obtain a regenerated powder. The composition of the regenerated powder thus obtained was 11.5 at % Nd, 6.5 at % B, 81.0 at % Fe, and 1.0 at % Co, and the texture was 99.5% $Nd_2Fe_{14}B$ phase.

Embodiment 2

500 g of a compositional adjusting powder composed of 16.5 at % Nd, 6.5 at % B, and the remainder Fe and having an average particle size of 3.5 mm that was obtained by ingot pulverization was added to 500 g of the regenerated powder obtained in Embodiment 1, and after mixing, the mixture was subjected to jet mill pulverization, which yielded a finely pulverized powder with an average particle size of approximately 3 μm.

The finely pulverized powder thus obtained was molded in a magnetic field of 12 kOe at a molding pressure of 1.3 tons/cm², after which it was sintered for 3 hours at 1090° C. in argon gas, and then subjected to aging for 1 hour at 600° C. to produce an R—Fe—B type sintered magnet. The magnetic characteristics of the magnet thus obtained were Br 12.8 kOe, iHc 14.1 kOe, and (BH)max 40.3 MGOe.

INDUSTRIAL APPLICABILITY

With the present invention, R—Fe—B type sintered magnets that are surplus, of the wrong size, cracked, or have become defective through distortion are pulverized, acid washed, and dried, after which this product is subjected to calcium reduction and washed to remove the calcium component, which allows for the efficient regeneration of a raw material alloy powder composed of an $Nd_2Fe_{14}B$ main phase system, which contributes the most to magnet characteristics. A sintered magnet with excellent magnet characteristics can be manufactured with ease by adding a compositional adjusting alloy powder for enhancing the sintering of this main phase raw material alloy powder and adjusting the composition. Another benefit of the present invention is the effective utilization of natural resources and environmental protection because magnets can be recycled from specific individual products.

What is claimed is:

1. A method for manufacturing an R—Fe—B type magnet raw material powder which yields an R—Fe—B type alloy powder composed almost solely of an $Nd_2Fe_{14}B$ main phase, comprising the steps of:

acid washing the scrap and/or pulverized powder of an R—Fe—B type sintered magnet; and subjecting the acid washed powder to calcium reduction.

2. A method for manufacturing an R—Fe—B type magnet raw material powder which yields an R—Fe—B type alloy powder composed almost solely of an $Nd_2Fe_{14}B$ main phase, comprising the steps of:

acid washing the scrap and/or pulverized powder of an R—Fe—B type sintered magnet;

subjecting the acid washed powder to calcium reduction; and removing the remaining calcium component from the reduction reaction product.

3. A method for manufacturing an R—Fe—B type magnet raw material powder which yields an R—Fe—B type alloy powder composed almost solely of an $Nd_2Fe_{14}B$ main phase, comprising the steps of:

acid washing the scrap and/or pulverized powder of an R—Fe—B type sintered magnet;

subjecting the acid washed powder to calcium reduction; and removing the remaining calcium component from the reduction reaction product by wet washing.

4. The method for manufacturing an R—Fe—B type magnet raw material powder defined in claim 1, 2, or 3, wherein the scrap and/or pulverized powder of an R—Fe—B type sintered magnet to be treated has an average particle size of 5 mm or less.

5. The method for manufacturing an R—Fe—B type magnet raw material powder defined in any of claims 1 to 3, wherein the pH of the acid solution used for acid washing is 2.0 to 5.0.

6. The method for manufacturing an R—Fe—B type magnet raw material powder defined in claim 3, wherein the wet washing treatment is a step using of a dilute acid with a pH of 11 or less.

7. A method for manufacturing an R—Fe—B type magnet, wherein an alloy powder used for compositional adjustment is added to an R—Fe—B type alloy powder composed almost solely of an $Nd_2Fe_{14}B$ main phase and obtained by the steps of:

acid washing the scrap and/or pulverized powder of an R—Fe—B type sintered magnet; and subjecting the acid washed powder to calcium reduction, after which this blend is molding, sintering, and heat treating.

8. A method for manufacturing an R—Fe—B type magnet, wherein an alloy powder used for compositional adjustment is added to an R—Fe—B type alloy powder composed almost solely of an $Nd_2Fe_{14}B$ main phase and obtained by the steps of:

acid washing the scrap and/or pulverized powder of an R—Fe—B type sintered magnet;

subjecting the acid washed powder to calcium reduction; and removing the remaining calcium component from the reduction reaction product, after which this blend is molding, sintering, and heat treating.

9. The method for manufacturing an R—Fe—B type magnet defined in claim 7 or 8, wherein the composition of the alloy powder used for compositional adjustment is 13 to 45 at % R, no more than 12 at % B, and the remainder Fe, which is the principal component.

10. The method for manufacturing an R—Fe—B type magnet defined in claim 7 or 8, wherein the blend ratio (wt %) of the alloy powder composed solely of the main phase and the alloy powder used for compositional adjustment is between 10:90 and 90:10.

* * * * *